(12) United States Patent
Alvarez-Icaza Rivera et al.

(10) Patent No.: US 9,563,841 B2
(45) Date of Patent: Feb. 7, 2017

(54) GLOBALLY ASYNCHRONOUS AND LOCALLY SYNCHRONOUS (GALS) NEUROMORPHIC NETWORK

(75) Inventors: Rodrigo Alvarez-Icaza Rivera, San Jose, CA (US); John V. Arthur, Mountain View, CA (US); Andrew S. Cassidy, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 13/563,333

(22) Filed: Jul. 31, 2012

(65) Prior Publication Data
US 2015/0302295 A1    Oct. 22, 2015

(51) Int. Cl.
*G06N 3/04* (2006.01)

(52) U.S. Cl.
CPC ............... *G06N 3/049* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 5,371,834 A | 12/1994 | Tawel | |
| 5,615,305 A | 3/1997 | Nunally | |
| 6,446,055 B1 | 9/2002 | Grand | |
| 7,908,235 B2 | 3/2011 | Snook et al. | |
| 2008/0005402 A1 | 1/2008 | Kim et al. | |
| 2011/0121857 A1 | 5/2011 | Nowick et al. | |
| 2013/0073497 A1* | 3/2013 | Akopyan | G06N 3/063 706/27 |

OTHER PUBLICATIONS

Jin et al. Modeling Spiking Neural Networks on SpiNNaker. Computing in Science & Engineering. pp. 91-97. Sep./Oct. 2010.*
IBM Press Room, "IBM Unveils Cognitive Computing Chips," IBM Press Release, Aug. 18, 2011, 2 pages, IBM Press Room, United States.
Plana, L.A. et al., "A GALS Infrastructure for a Massively Parallel Multiprocessor," IEEE Design & Test of Computers, Sep./Oct. 2007, pp. 454-463, vol. 24, No. 5, IEEE, United States.
Imam, N. et al., "Address-Event Communication Using Token-Ring Mutual Exclusion," Proceedings of the 2011 17th IEEE International Symposium on Asynchronous Circuits and Systems (ASYNC '11), 2011, pp. 99-108, IEEE, United States.

* cited by examiner

*Primary Examiner* — Stanley K Hill
*Assistant Examiner* — Robert H Bejcek, II
(74) *Attorney, Agent, or Firm* — Sherman IP LLP; Kenneth L. Sherman; Hemavathy Perumal

(57) ABSTRACT

Embodiments of the invention relate to a globally asynchronous and locally synchronous neuromorphic network. One embodiment comprises generating a synchronization signal that is distributed to a plurality of neural core circuits. In response to the synchronization signal, in at least one core circuit, incoming spike events maintained by said at least one core circuit are processed to generate an outgoing spike event. Spike events are asynchronously communicated between the core circuits via a routing fabric comprising multiple asynchronous routers.

20 Claims, 9 Drawing Sheets

US 9,563,841 B2

GLOBALLY ASYNCHRONOUS AND LOCALLY SYNCHRONOUS (GALS) NEUROMORPHIC NETWORK

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a globally asynchronous and locally synchronous neuromorphic network.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a globally asynchronous and locally synchronous neuromorphic network. One embodiment comprises generating a synchronization signal that is distributed to a plurality of neural core circuits. In response to the synchronization signal, in at least one core circuit, incoming spike events maintained by said at least one core circuit are processed to generate an outgoing spike event. Spike events are asynchronously communicated between the core circuits via a routing fabric comprising multiple asynchronous routers.

Another embodiment comprises a neural network comprising a plurality of neural core circuits. Each core circuit comprises multiple digital neurons, multiple digital axons, and multiple digital synapses. Each synapse interconnects an axon with a neuron. The neural network further comprises a routing fabric comprising multiple asynchronous routers that interconnect the core circuits. The routing fabric facilitates asynchronous communication of spike events between the core circuits. A plurality of the core circuits process spike events synchronously in response to a synchronization signal.

These and other features, aspects and advantages of the present invention will become understood with reference to the following description, appended claims and accompanying figures.

DETAILED DESCRIPTION

Figure 1:
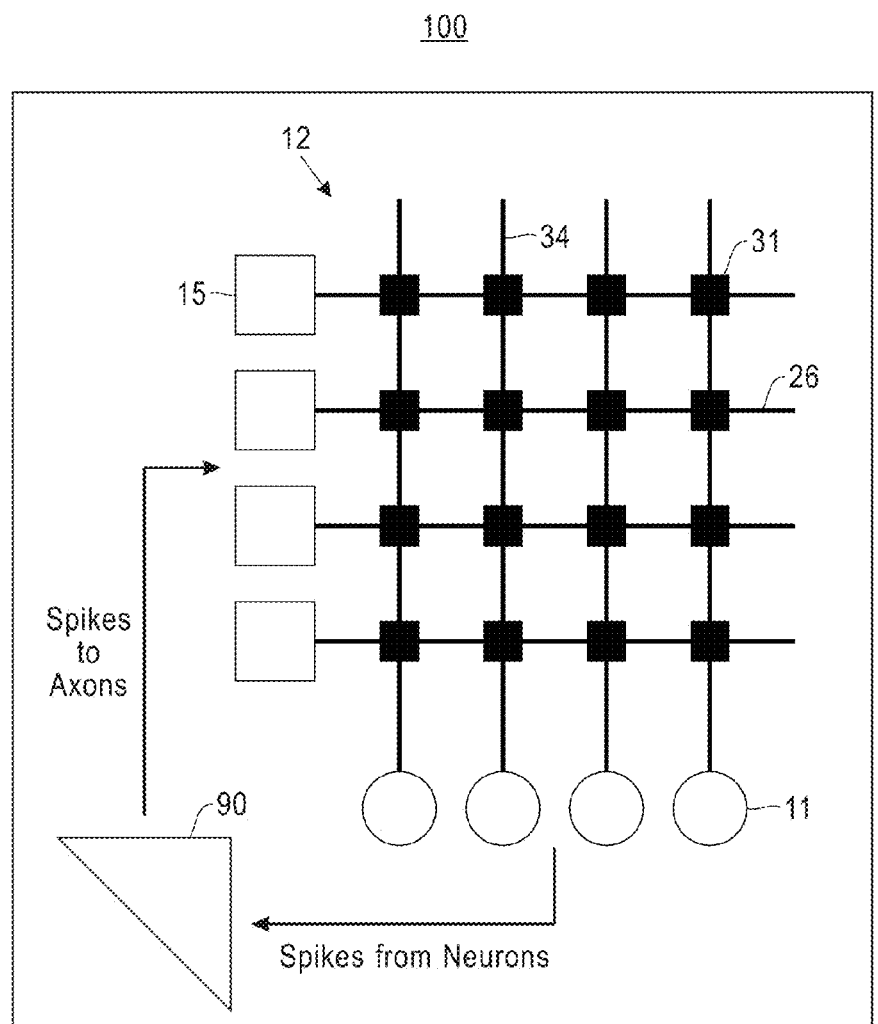
FIG. 1 illustrates a neural core circuit, in accordance with an embodiment of the invention.

Embodiments of the invention relate to a globally asynchronous and locally synchronous neuromorphic network. One embodiment comprises generating a synchronization signal that is distributed to a plurality of neural core circuits. In response to the synchronization signal, in at least one core circuit, incoming spike events maintained by said at least one core circuit are processed to generate an outgoing spike event. Spike events are asynchronously communicated between the core circuits via a routing fabric comprising multiple asynchronous routers.

Another embodiment comprises a neural network comprising a plurality of neural core circuits. Each core circuit comprises multiple digital neurons, multiple digital axons, and multiple digital synapses. Each synapse interconnects an axon with a neuron. The neural network further comprises a routing fabric comprising multiple asynchronous routers that interconnect the core circuits. The routing fabric facilitates asynchronous communication of spike events between the core circuits. A plurality of the core circuits process spike events synchronously in response to a synchronization signal.

Each core circuit is connected to a corresponding router via a local channel of the corresponding router. Each neuron of each core circuit receives incoming spike events from another neuron of the neural network via the corresponding router of said core circuit. Each neuron of each core circuit sends outgoing spike events to a different neuron of the neural network via the corresponding router of said core circuit.

The routers are interconnected via bus links. Each router further includes a northbound channel for transmitting spike events to a connected router in the northbound direction, a southbound channel for transmitting spike events to a connected router in the southbound direction, an eastbound channel for transmitting spike events to a connected router in the eastbound direction, and a westbound channel for transmitting spike events to a connected router in the westbound direction.

A controller generates synchronization signals. Each synchronization signal is a discrete time step. Each synchronization signal is distributed to every core circuit simultaneously, such that the core circuits synchronously process incoming spike events upon receiving said synchronization signal.

Each core circuit further comprises a memory array. Each row of the memory array maintains synaptic connectivity information, neuron parameters, and routing information for a corresponding neuron of said core circuit. Each core circuit further comprises a processing circuit for processing and integrating incoming spike events. Each core circuit further comprises a scheduler. The scheduler maintains all incoming spike events for the current time step and future time steps. In one embodiment, the scheduler of each core circuit selectively imposes a delay on delivery of the incoming spike events for deterministic event delivery.

The term digital neuron as used herein represents a framework configured to simulate a biological neuron. An digital neuron creates connections between processing elements that are roughly functionally equivalent to neurons of a biological brain. As such, a neuromorphic and synaptronic computation comprising digital neurons according to embodiments of the invention may include various digital circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

For a neural network comprising multiple neural core circuits ("cores"), a globally asynchronous routing network for routing spike events between the cores help minimize the consumption of active power in the neural network. Cores in the neural network, however, consume significantly less active power when operating synchronously as compared to when operating asynchronously. Embodiments of a globally asynchronous and locally synchronous (GALS) neuromorphic network are provided. Embodiments of the GALS network disclosed herein can be used to implement a multicore chip structure comprising asynchronous routers operating at a relatively fast speed, and synchronous cores operating at a relatively low clock speed.

FIG. 1 illustrates a neural core circuit ("core") 100, in accordance with an embodiment of the invention. The core 100 comprises multiple pre-synaptic axons 15 and multiple post-synaptic neurons 11. Each neuron 11 has configurable operational parameters. The core 100 further comprises a synaptic crossbar 12 including multiple synapses 31, multiple rows/axon paths 26, and multiple columns/dendrite paths 34.

Each synapse 31 communicates spike events ("spikes") between a pre-synaptic axon 15 and a post-synaptic neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends spikes to the connected axon path 26. Each neuron 11 is connected to a dendrite path 34, such that said neuron 11 receives spikes from the connected dendrite path 34.

Each synapse 31 has a synaptic weight. The synaptic weights of the synapses 31 of the core 100 may be represented by a weight matrix W, wherein an element $W_{ji}$ of the matrix W represents a synaptic weight of a synapse 31 located at a row/axon path j and a column/dendrite path i of the crossbar 12. In one embodiment, the synapses 31 are binary memory devices. Each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

The core 100 further comprises a spike interface module 90 configured to receive address-event packets (AER event). Each address-event packet received includes a spike encoded as an address (e.g., an address represented as bits) representing a target axon 15, wherein the spike was generated by a neuron 11 in the same core 100 or a different core 100. The spike interface module 90 decodes each address-event packet received, and transmits the spike to the target axon 15.

The spike interface module 90 is also configured to receive spikes generated by the neurons 11 in the core 100. The spike interface module 90 encodes/encapsulates each spike generated as an address-event packet having the address of a target incoming axon 15, and sends/routes the address-event packet to a core 100 (e.g., the same core 100 or a different core 100) containing the target incoming axon 15.

Figure 2:
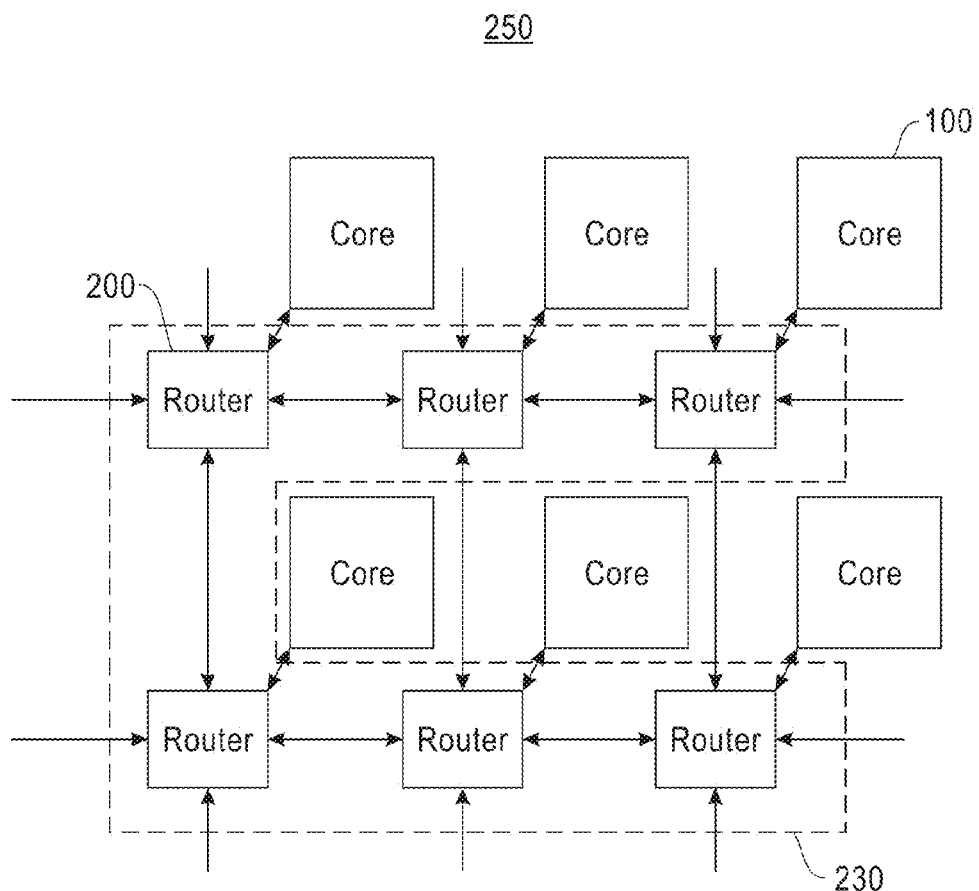
FIG. 2 is a block diagram illustrating a neural network, in accordance with an embodiment of the invention.

FIG. 2 is a block diagram illustrating a neural network 250, in accordance with an embodiment of the invention. The network 250 comprises multiple cores 100. The network 250 further comprises a routing fabric 230 including multiple asynchronous routers 200 that interconnect the cores 100 of the network 250. As described in detail later herein, the routers 200 facilitate asynchronous inter-core communication. Each core 100 is interconnected to a corresponding router 200.

Figure 3:
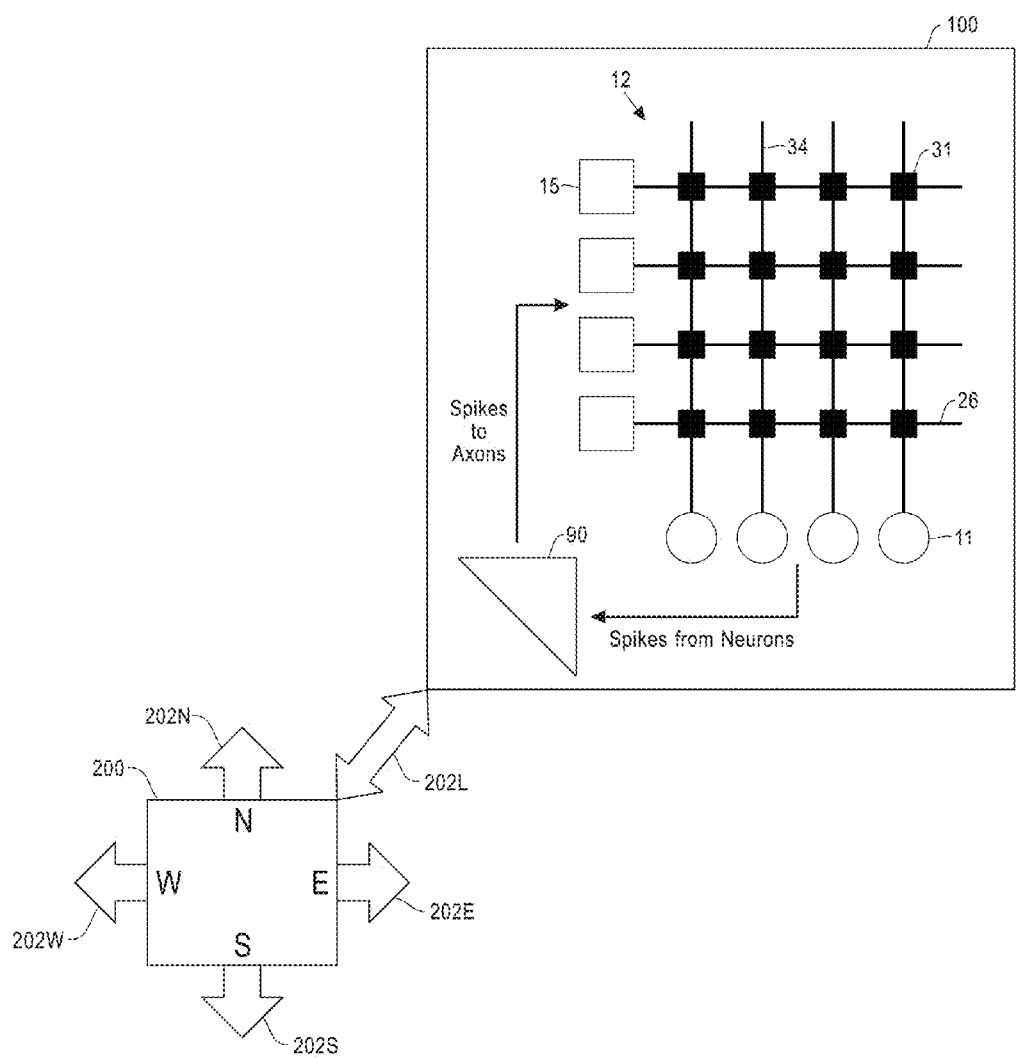
FIG. 3 illustrates a neural core circuit interconnected to a corresponding asynchronous router, in accordance with an embodiment of the invention.

FIG. 3 illustrates a neural core circuit 100 interconnected to a corresponding asynchronous router 200, in accordance with an embodiment of the invention. Each router 200 has a local channel 202L connecting said router 200 to a corresponding core 100. A router 200 may have more than one local channel 202L, such that the router 100 is connected to multiple cores 100. Each core 100 receives address-event packets from other cores 100 via a local channel 202L of a corresponding router 200. Each core 100 sends address-event packets to other cores 100 via a local channel 202L of a corresponding router 200.

Each router 200 further includes a northbound channel 202N, a southbound channel 202S, an eastbound channel 202E, and a westbound channel 202W for passing along address-event packets to neighboring routers 200 in the northbound, southbound, eastbound, and westbound directions, respectively.

Figure 4:
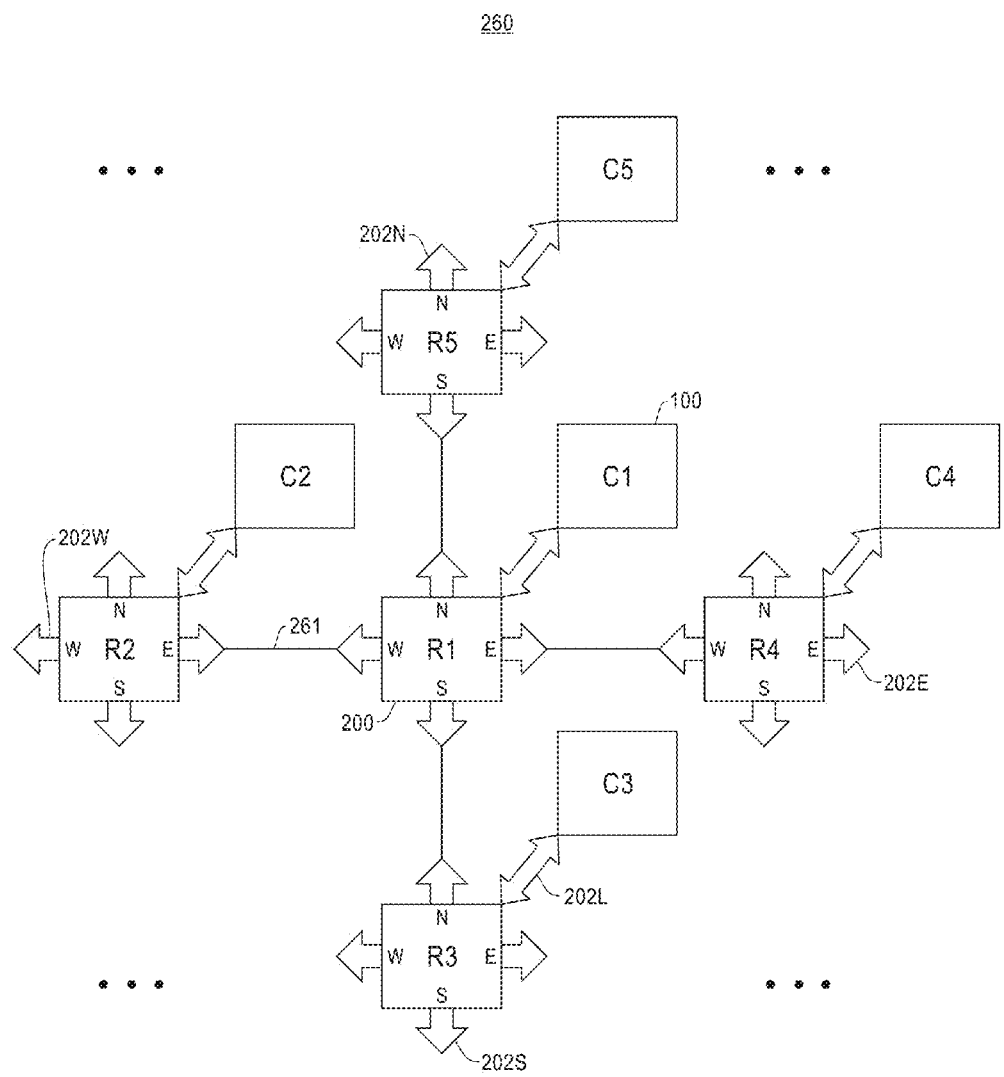
FIG. 4 illustrates inter-core communication in a neural network, in accordance with an embodiment of the invention.

FIG. 4 illustrates inter-core communication in a neural network 260, in accordance with an embodiment of the invention. The network 260 comprises multiple cores 100, such as a first core C1, a second core C2, a third core C3, a fourth core C4, and a fifth core C5. The network 260 further comprises multiple routers 200, such as a first router R1, a second router R2, a third router R3, a fourth router R4, and a fifth router R5. A router 200 may be interconnected to four different routers 200 via bus lines 261. For example, a northbound channel 202N of the first router R1 may be interconnected to a southbound channel 202S of the fifth router R5, a southbound channel 202S of the first router R1 may be interconnected to a northbound channel 202N of the third router R3, an eastbound channel 202E of the first router R1 may be interconnected to a westbound channel 202W of the fourth router R4, and a westbound channel 202W of the first router R1 may be interconnected to an eastbound channel 202E of the second router R2.

The routing of address-event packets between cores 100 follow dimension order routing (for example, route north to south, then west to east).

The asynchronous routers 200 minimize the consumption of active power across the neural network, ensuring that bus links 261 are active only when absolutely necessary. Further, asynchronous routers 200 remove the need to distribute a global clock signal across all routers 200 in the network.

Figure 5:
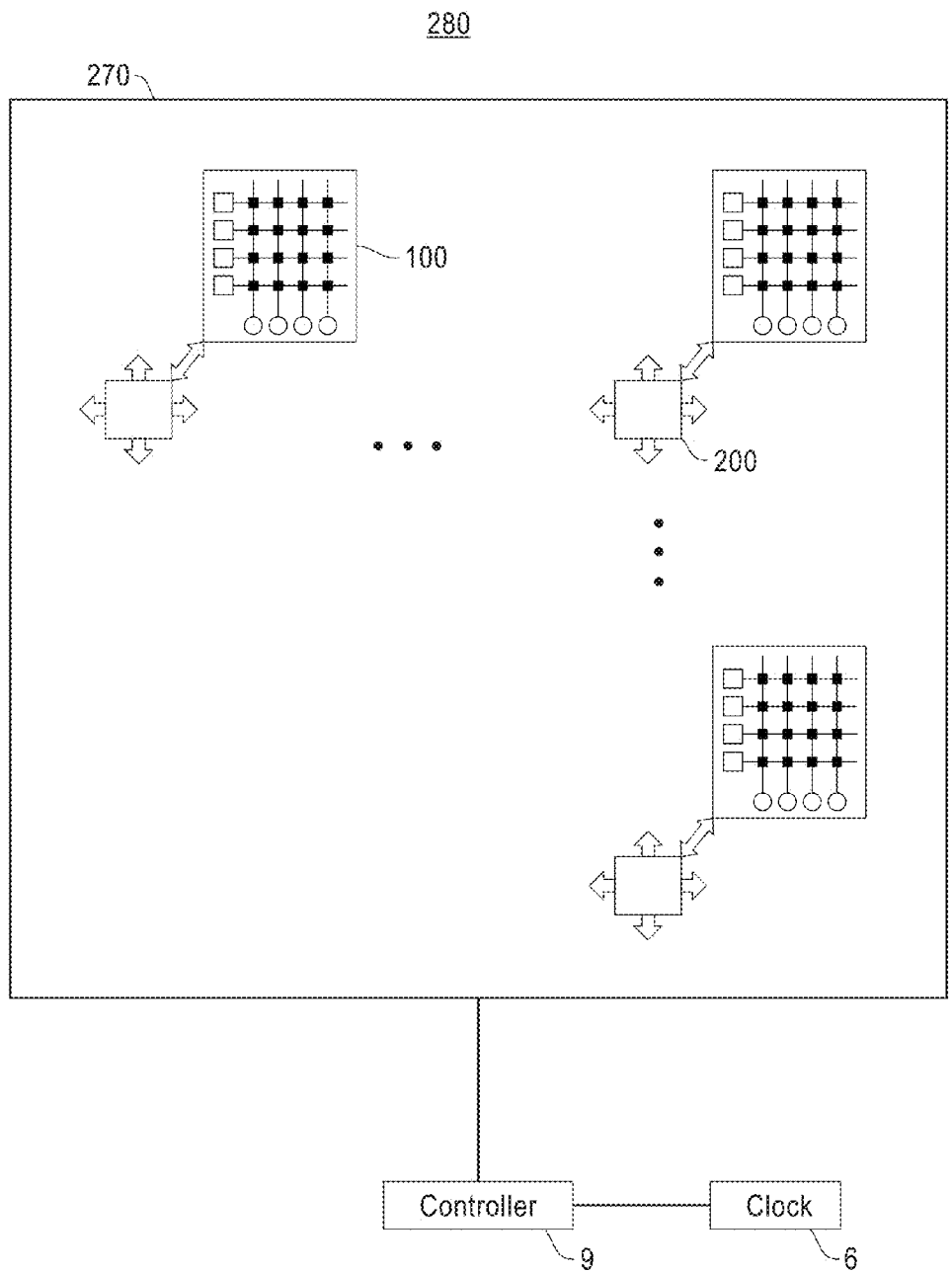
FIG. 5 illustrates neural network comprising at least one multi-core chip structure, in accordance with an embodiment of the invention.

FIG. 5 illustrates neural network 280 comprising at least one multi-core circuit chip structure 270, in accordance with an embodiment of the invention. A neural network may be implemented as a circuit chip structure 270. The chip structure 270 comprises multiple cores 100 and multiple routers 200 facilitating asynchronous inter-core communication. While the routing of address-event packets between the cores 100 is asynchronous, the cores 100 process spikes synchronously. The asynchronous routers 200 can operate at a faster speed than the synchronous cores 100.

To facilitate the synchronous operation of the cores 100, the network 280 further comprises a clock 6 and a controller 9. In one embodiment, the clock 6 and the controller 9 are off-chip. The clock 6 produces clock signals used by the controller 9 to generate global synchronization signals. Each global synchronization signal generated signifies a global time step. Each global synchronization signal generated is distributed to all cores 100 in the network 280 at the same time. The dynamics of each core 100 is driven by a discrete global time step. Upon receiving a global synchronization signal, each core 100 begins to process the incoming spikes for the global time step signified by the global synchronization signal. As such, the cores 100 begin processing incoming spikes at the same time (i.e., synchronously). The cores 100, however, can finish updating the operational states of its neurons 11 on different time scales. A core 100 may finish updating the operational states of its neurons 11 faster or slower than a different core 100 in the network 280. Each core 100, however, must complete updating the operational states of its neurons 11 before the next global synchronization signal is received.

Figure 6:
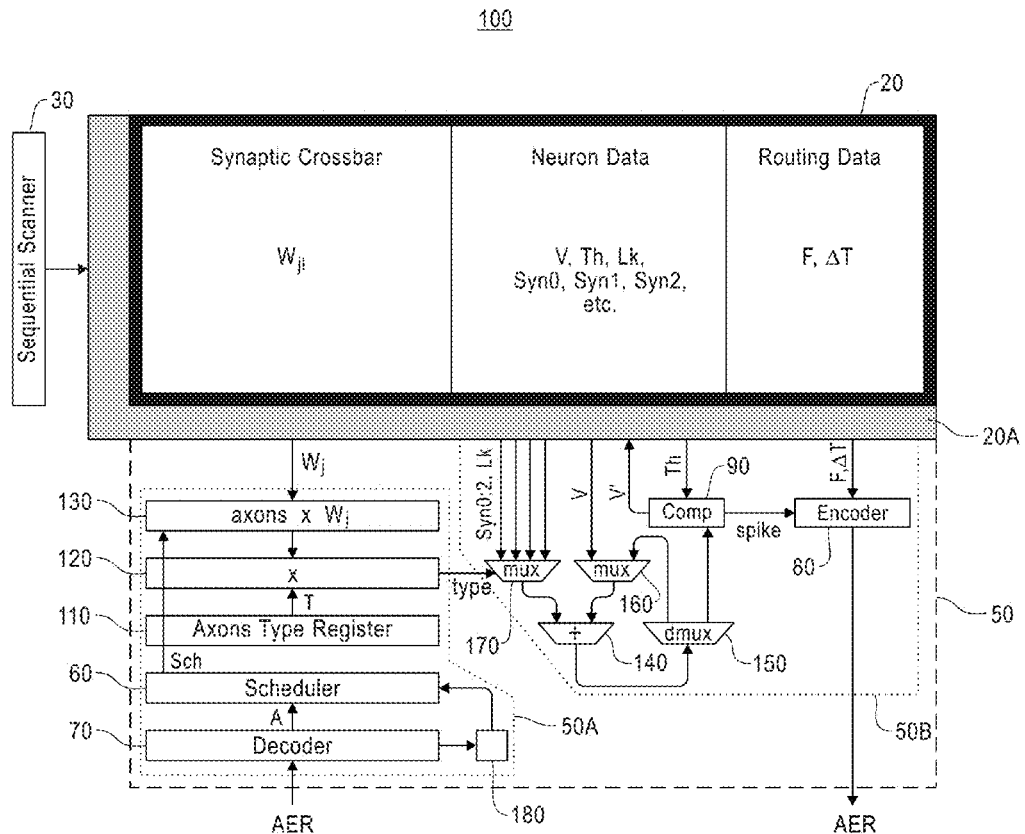
FIG. 6 is a block diagram illustrating a memory array and a processing circuit of a core, in accordance with an embodiment of the invention.

FIG. 6 is a block diagram illustrating a memory array 20 and a processing circuit 50 of a core 100, in accordance with an embodiment of the invention. In one embodiment, the neurons 11 in the core 100 are multiplexed, such that each neuron 11 in the core 100 shares the same processing circuit 50 with other neurons 11 of the core 100. The cores 100 may operate synchronously or asynchronously.

Figure 7:
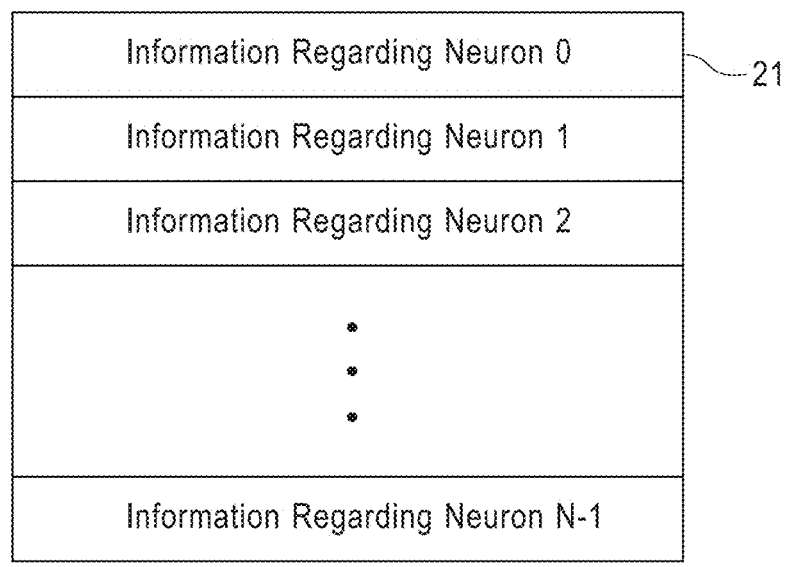
FIG. 7 is a block diagram showing a memory array of a core, in accordance with an embodiment of the invention.

The memory array 20 maintains information relating to all neurons 11 of the core 100. The memory array 20 includes multiples rows 21 (FIG. 7). Each row 21 of the memory array 20 corresponds to a neuron 11 of the core 100. Specifically, each row 21 maintains information relating to a corresponding neuron 11 of the core 100, wherein the information maintained includes synaptic connectivity information ($W_{ji}$), neuron parameters, and routing information of the corresponding neuron 11. In one embodiment, the neuron parameters maintained for each neuron 11 include the membrane potential variable V of said neuron 11, the spike threshold Th of said neuron 11, the leak rate Lk of said neuron 11, and the weight of all possible axon types (Syn0, Syn1, Syn2). The routing information maintained for each neuron 11 include the fanout F of said neuron 11, and the routing delay $\Delta T$ of said neuron 11. The synaptic connectivity information maintained for each neuron 11 includes the synaptic weights for all synapses 31 that a dendrite path 34 of said neuron 11 is connected to.

In one embodiment, the processing circuit 50 comprises an input processing fabric 50A and a computation fabric 50B. The processing fabric 50A comprises a decoder 70, a scheduler 60, a control unit 180, an axon type register 110, a logical AND operator 120, and a dot product module 130. The computation fabric 50B comprises a first multiplexer 170, an adder 140, a second multiplexer 160, a demultiplexer 150, a comparator module ("comparator") 90, and an encoder 80. The decoder 70 is configured for receiving and decoding address-event packets from a corresponding asynchronous router 200 of the core 100.

In one embodiment, the core 100 is synchronous and the scheduler 60 of the core 100 bridges the corresponding high-bandwidth asynchronous router 200 to the relatively low-frequency synchronous core 100. In one example implementation, the scheduler 60 is a dual port memory including rows and columns. Spikes from decoded address-event packets are stored in the scheduler 60, wherein rows represent future time steps and columns represents axons 15 of the core 100. The control unit 180 alerts the scheduler 60 when a spike from a decoded address-event packet is ready to be written in the scheduler 60. The control unit 180 may also be used to compute a delay for a spike queued in the scheduler.

Specifically, a delay is selectively imposed on received spikes before transmitting them to target axons 15. Each address-event packet further includes a time stamp indicating when a spike encapsulated in said address-event packet was generated. Using the arrival time of the address-event packet at the decoder 70 and the time stamp, the control unit 180 determines how long the spike has spent on route to the decoder 70 as the difference d between the arrival time and the time stamp. If the difference d is less than a predetermined delivery delay (or predetermined total delay) n, the spike is held in the scheduler 60 for a delay period D equal to the difference between n and d, to achieve n timestamps from spike generation to spike delivery, and the scheduler 60 delivers the spike at the end of the delay period.

For example, if a spike requires between 3 and 9 time steps to propagate in a neural network, the scheduler 60 ensures 9 time steps for all spikes. In one example, even if a spike arrives at the decoder 70 within 3 time steps from generation, the scheduler 60 delays transmission of that spike by 6 time steps such that the spike is transmitted from the scheduler 60 at the end of 9 time steps from spike generation.

In another embodiment, the delay is computed at the source of the spike (i.e., the core 100 that the spike originates from) before the spike is sent to the router 200 for delivery to a target axon 15.

Once a global synchronization signal is received, a vector indicating all active axons 15 in the current time step is read from the scheduler 60 as a row. The entire memory array 20 is then read and written once per time step.

Specifically, for each time step, rows 21 of the array 20 are sequentially read out one at a time using a sequential scanner 30. The axon type register 110, the logical AND operator 120, the dot product module 130, the first 170, the adder 140, the second multiplexer 160, and the demultiplexer 150 are used to integrate spikes for each neuron 11 of the core 100.

For each row 21 representing a neuron 11, the dot product module 130 computes the dot product between the vector of active axons 15 in the current time step and the synaptic connectivity information maintained in said row 21, i.e., the synaptic weights of all synapses 31 the dendrite 34 of the neuron 11 is connected to (Wj). The operator 120 logically ANDs the resulting dot product with the axon types maintained in the axon type register 110 to generate a queue of axon types. For each axon type in the queue, a membrane potential variable V maintained in said row 21 is updated with the corresponding synaptic weight using an arithmetic logic unit (ALU) such as an adder 140. After all spikes are integrated, the leak rate Lk maintained in said row 21 is added to the membrane potential variable V. The comparator 90 determines whether the integrated spikes for said row 21 exceeds a threshold parameter Th maintained in said row 21. If the threshold parameter Th is exceeded, the encoder 80 generates a spike and uses the fanout F and the routing delay of $\Delta T$ information maintained in said row 21 to encapsulate the generated spike into an address-event packet. The membrane potential variable V is reset to a preset value before it is written back to said row 21.

FIG. 7 is a block diagram showing a memory array 20 of a core 100, in accordance with an embodiment of the invention. As stated above, the memory array 20 maintains information relating to all neurons 11 of the core 100. The memory array 20 includes multiples rows 21, wherein each row 21 of the memory array 20 corresponds to a neuron 11 of the core 100. Specifically, each row 21 maintains information relating to a corresponding neuron 11 of the core 100, wherein the information maintained includes synaptic connectivity information, neuron parameters, and routing information of the corresponding neuron 11.

Figure 8:
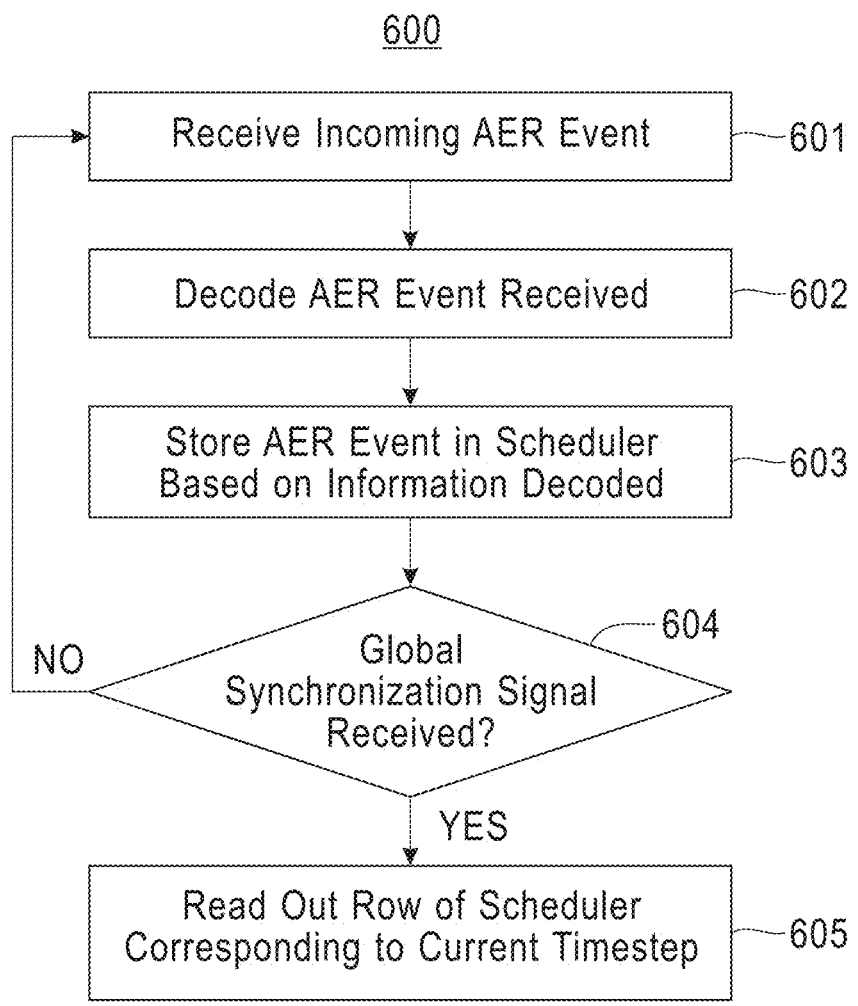
FIG. 8 illustrates a flowchart of an example process for scheduling spikes in a core, in accordance with an embodiment of the invention.

FIG. 8 illustrates a flowchart of an example process 600 for scheduling spikes in a core 100, in accordance with an embodiment of the invention. In process block 601, the decoder 70 receives address-event packets (AER event). In process block 602, the decoder 70 decodes each address-event packet received. In process block 603, decoded address-event packet (i.e., spike) is stored in the scheduler 60 based on the information decoded. In process block 604, the core 100 determines whether a global synchronization signal was received. If the signal has been received, proceed to process block 605 where a row in the scheduler corresponding to the current time step is read out to trigger the integrating of spikes. If no signal was received, return to process block 601.

Figure 9:
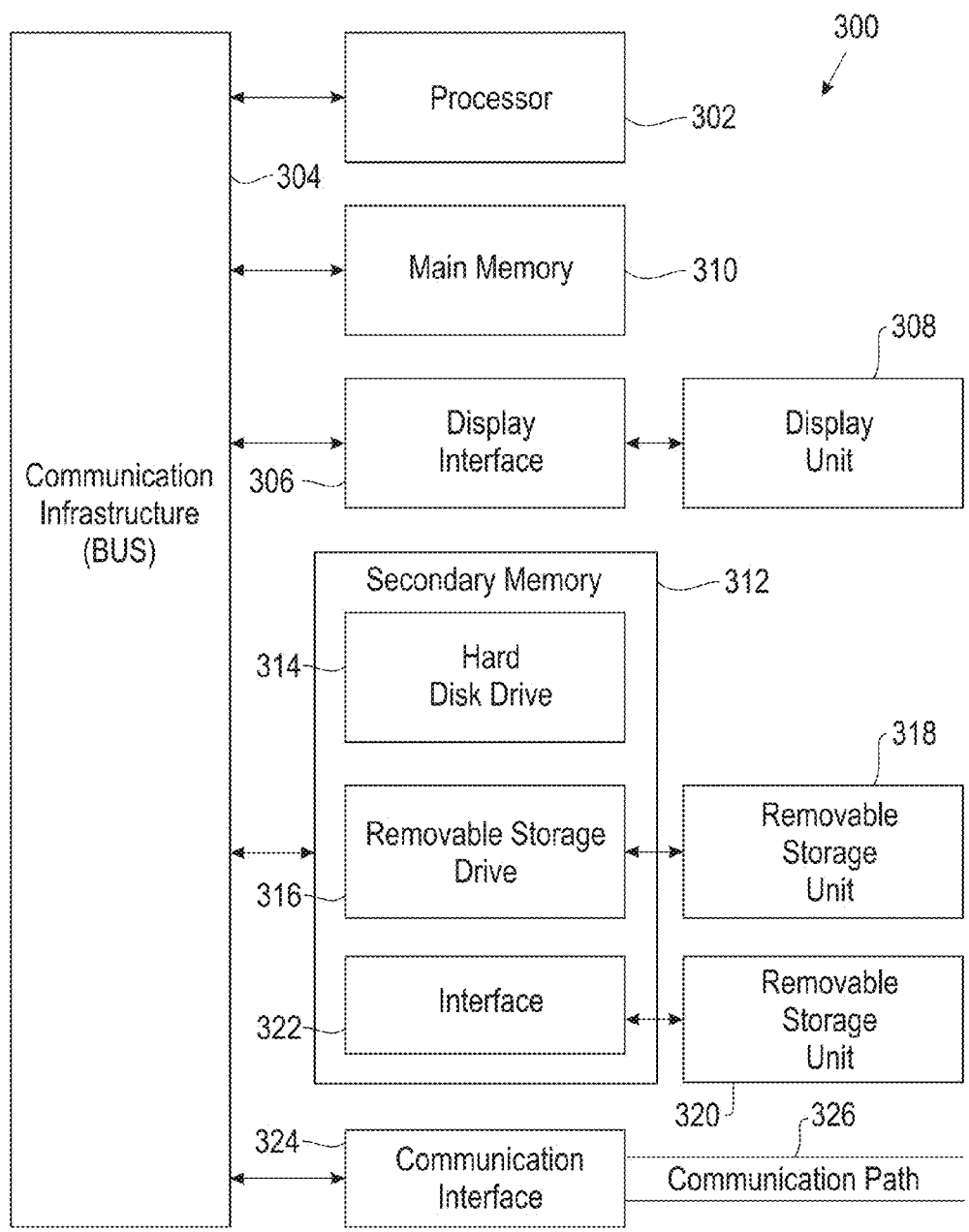
FIG. 9 is a high level block diagram showing an information processing circuit useful for implementing one embodiment of the invention.

FIG. 9 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   at each core circuit of a plurality of hardware core circuits;
      receiving a synchronization signal, wherein the synchronization signal is distributed to the plurality of core circuits at the same time;
      in response to receiving the synchronization signal, initiate processing of one or more incoming spike events received by the core circuit;
      updating one or more operational states of one or more neurons of the core circuit based on the one or more incoming spike events processed, wherein the one or more operational states are updated on a time scale corresponding to the core circuit, and the time scale is different from another time scale corresponding to another core circuit of the plurality of core circuits; and
      generating one or more outgoing spike events based on the one or more operational states updated, wherein the one or more outgoing spike events are asynchronously communicated between the plurality of core circuits via a routing fabric comprising multiple asynchronous routers;
   wherein the plurality of core circuits initiate processing of incoming spike events at the same time and finish updating operational states of neurons on different time scales, such that a first core circuit of the plurality of core circuits finishes updating operational states of neurons of the first core circuit faster than a second core circuit of the plurality of core circuits finishes updating operational states of neurons of the second core circuit; and
   wherein each core circuit of the plurality of core circuits finishes updating operational states of neurons of the core circuit before another synchronization signal is distributed to the plurality of core circuits.

2. The method of claim 1, further comprising:
   at each core circuit:
      receiving one or more incoming spike events via an asynchronous router of the multiple asynchronous routers, wherein the asynchronous router corresponds to the core circuit and is connected to the core circuit; and
      sending one or more outgoing spike events via the corresponding asynchronous router of the core circuit.

3. The method of claim 2, wherein:
   the multiple asynchronous routers are interconnected; and
   each asynchronous router is configured for:
      transmitting spike events to a connected asynchronous router in a northbound direction;
      transmitting spike events to a connected asynchronous router in a southbound direction;
      transmitting spike events to a connected asynchronous router in an eastbound direction; and
      transmitting spike events to a connected asynchronous router in a westbound direction.

4. The method of claim 3, wherein:
   each synchronization signal is a discrete time step;
   each synchronization signal is distributed to each core circuit simultaneously, such that the plurality of core circuits synchronously process incoming spike events upon receiving the synchronization signal; and
   each core circuit finishes updating one or more operational states of one or more neurons of the core circuit before receiving another synchronization signal.

5. The method of claim 4, further comprising:
   at each core circuit:
      maintaining synaptic connectivity information, neuron parameters, and routing information for one or more neurons of the core circuit.

6. The method of claim 5, further comprising:
   at each core circuit:
      processing and integrating one or more incoming spike events.

7. The method of claim 6, further comprising:
   at each core circuit:
      maintaining one or more incoming spike events for a current time step and one or more future time steps.

8. The method of claim 7, wherein:
   a delay is selectively imposed on delivery of one or more incoming spike events for deterministic event delivery.

9. A neural network, comprising:
   a plurality of hardware core circuits, wherein each core circuit comprises:
      multiple digital neurons;
      multiple digital axons; and
      multiple digital synapses, wherein each synapse interconnects an axon with a neuron; and
   a routing fabric comprising multiple asynchronous routers interconnecting the plurality of core circuits, wherein the routing fabric facilitates asynchronous communication of spike events between the plurality of core circuits;
   wherein each core circuit is configured for:
      receiving a synchronization signal, wherein the synchronization signal is distributed to the plurality of core circuits at the same time;

in response to receiving the synchronization signal, initiate processing of one or more incoming spike events received by the core circuit;

updating one or more operational states of one or more neurons of the core circuit based on the one or more incoming spike events processed, wherein the one or more operational states are updated on a time scale corresponding to the core circuit, and the time scale is different from another time scale corresponding to another core circuit of the plurality of core circuits; and generating one or more outgoing spike events based on the one or more operational states updated, wherein the one or more outgoing spike events are asynchronously communicated between the plurality of core circuits via a routing fabric comprising multiple asynchronous routers;

wherein the plurality of core circuits initiate processing of incoming spike events at the same time and finish updating operational states of neurons on different time scales, such that a first core circuit of the plurality of core circuits finishes updating operational states of neurons of the first core circuit faster than a second core circuit of the plurality of core circuits finishes updating operational states of neurons of the second core circuit; and wherein each core circuit of the plurality of core circuits finishes updating operational states of neurons of the core circuit before another synchronization signal is distributed to the plurality of core circuits.

10. The neural network of claim 9, wherein:
at each core circuit:
the core circuit is connected to an asynchronous router of the multiple asynchronous routers, wherein the asynchronous router corresponds to the core circuit;
each neuron of the core circuit receives incoming spike events from another neuron of the neural network via the corresponding asynchronous router of the core circuit; and
each neuron of the core circuit sends outgoing spike events to a different neuron of the neural network via the corresponding asynchronous router of the core circuit.

11. The neural network of claim 10, wherein:
the multiple asynchronous routers are interconnected via bus links; and
each asynchronous router further includes:
a northbound channel for transmitting spike events to a connected asynchronous router in a northbound direction;
a southbound channel for transmitting spike events to a connected asynchronous router in a southbound direction;
an eastbound channel for transmitting spike events to a connected asynchronous router in an eastbound direction; and
a westbound channel for transmitting spike events to a connected asynchronous router in a westbound direction.

12. The neural network of claim 11, further comprising:
a controller for generating synchronization signals, wherein each synchronization signal is a discrete time step;
wherein each synchronization signal is distributed to each core circuit simultaneously, such that the plurality of core circuits synchronously process incoming spike events upon receiving the synchronization signal.

13. The neural network of claim 12, wherein each core circuit further comprises:
a memory array, wherein each row of the memory array maintains synaptic connectivity information, neuron parameters, and routing information for a corresponding neuron of the core circuit.

14. The neural network of claim 13, wherein:
each core circuit further comprises a processing circuit for processing and integrating incoming spike events.

15. The neural network of claim 14, wherein:
each core circuit further comprises a scheduler, wherein the scheduler maintains all incoming spike events for a current time step and one or more future time steps.

16. The neural network of claim 15, wherein:
the scheduler of each core circuit selectively imposes a delay on delivery of one or more incoming spike events for deterministic event delivery.

17. A non-transitory computer-useable storage medium for a neural network comprising a plurality of neural core circuits, wherein the program upon being processed on a computer causes the computer to:
at each core circuit of a plurality of hardware core circuits:
receiving a synchronization signal, wherein the synchronization signal is distributed to the plurality of core circuits at the same time;
in response to receiving the synchronization signal, initiate processing of one or more incoming spike events received by the core circuit;
updating one or more operational states of one or more neurons of the core circuit based on the one or more incoming spike events processed, wherein the one or more operational states are updated on a time scale corresponding to the core circuit, and the time scale is different from another time scale corresponding to another core circuit of the plurality of core circuits; and
generating one or more outgoing spike events based on the one or more operational states updated, wherein the one or more outgoing spike events are asynchronously communicated between the plurality of core circuits via a routing fabric comprising multiple asynchronous routers;
wherein the plurality of core circuits initiate processing of incoming spike events at the same time and finish updating operational states of neurons on different time scales, such that a first core circuit of the plurality of core circuits finishes updating operational states of neurons of the first core circuit faster than a second core circuit of the plurality of core circuits finishes updating operational states of neurons of the second core circuit; and
wherein each core circuit of the plurality of core circuits finishes updating operational states of neurons of the core circuit before another synchronization signal is distributed to the plurality of core circuits.

18. The program of claim 17, further causing the computer to:
at each core circuit:
receiving one or more incoming spike events via an asynchronous router of the multiple asynchronous routers, wherein the asynchronous router corresponds to the core circuit and is connected to the core circuit; and
sending one or more outgoing spike events via the corresponding asynchronous router of the core circuit.

19. The program of claim 18, further causing the computer to:
the multiple asynchronous routers are interconnected; and
each asynchronous router is configured to:
transmit spike events to a connected asynchronous router in a northbound direction;
transmit spike events to a connected asynchronous router in a southbound direction;
transmit spike events to a connected asynchronous router in an eastbound direction; and
transmit spike events to a connected asynchronous router in a westbound direction.

20. The program of claim 19, wherein:
each synchronization signal is a discrete time step;
each synchronization signal is distributed to each core circuit simultaneously, such that the plurality of core circuits synchronously process incoming spike events upon receiving the synchronization signal;
each core circuit finishes updating one or more operational states of one or more neurons of the core circuit before receiving another synchronization signal;
each core circuit:
processes and integrates incoming spike events; and
maintains one or more incoming spike events for a current time step and one or more future time steps; and
a delay is selectively imposed on delivery of one or more incoming spike events for deterministic event delivery.

* * * * *